United States Patent

Koshugi

[11] 4,401,807
[45] Aug. 30, 1983

[54] SHAPED MATERIAL COMPRISING ACYLATED PRODUCT OF MIXTURE OF CHITIN DERIVATIVES

[75] Inventor: Junichi Koshugi, Tokyo, Japan

[73] Assignee: Kureha Kagaku Kogyo Kabushiki Kaisha, Japan

[21] Appl. No.: 185,953

[22] Filed: Sep. 10, 1980

[30] Foreign Application Priority Data

Sep. 18, 1979 [JP] Japan ................... 54-119846

[51] Int. Cl.³ .............................. C08B 37/08
[52] U.S. Cl. ....................... 536/20; 424/180
[58] Field of Search .......................... 536/20

[56] References Cited

U.S. PATENT DOCUMENTS 3,879,376 4/1975 Vanlerberghe et al. ............ 536/20
4,063,016 12/1977 Austin ................................ 536/20

FOREIGN PATENT DOCUMENTS 894993 10/1949 Fed. Rep. of Germany ........ 536/20

Primary Examiner—Johnnie R. Brown
Attorney, Agent, or Firm—Wegner & Bretschneider

[57] ABSTRACT

A shaped material is described having at least a surface layer which consists essentially of an acylated mixture of two or more kinds of chitin derivatives represented by the following formula (1):

$$[(C_6H_8O_3 \cdot (NH_2)_x \cdot (NHCOCH_3)_y \cdot (OR)_b]_n \quad (1)$$

wherein R represents a carboxyalkyl group with two to four carbon atoms, a hydroxyethyl group, a hydroxypropyl group, a dihydroxypropyl group or an alkyl group with one to three carbon atoms, x is a number of 0.1 to 1.0, $y = 1.0 - x$, a is a number of 0 to 1.0, and $b = 1.0 - a$, or a salt thereof.

10 Claims, No Drawings

SHAPED MATERIAL COMPRISING ACYLATED PRODUCT OF MIXTURE OF CHITIN DERIVATIVES

This invention relates to a novel shaped material of an acylated product consisting essentially of a mixture of chitin derivatives, the said product being useful as fillers for chromatographic columns, as a base material for immobilizing enyzmes, as an ion exchange resin and so on.

Fiberforming polysaccharides occurring in nature are divided broadly into collagen in higher animals, chitin in arthropods and lower animals and cellulose in higher plants, and the skeletons of the living things are made by the sedimentation of apatite, calcium carbonate and lignin onto the above-mentioned polysaccharide respectively. Among them, chitin is a mucopolysaccharide of poly-N-acetyl-D-glucosamine, and its amount in nature compares favorably with the amount of cellulose in nature. However, since chitin is a highly crystalline substance and the intermolecular bonding thereof through the aminoacetyl group is extremely stable, it is very difficult to find an appropriate solvent in which to dissolve, disperse or swell the chitin favorably. Accordingly, the development of the utilization of chitin resources is far behind that of cellulose and other polysaccharides.

According to the recent research concerning chitin or chitin derivatives, films or fibers consisting of a regenerated chitin can be obtained by the acetylation of a chitosan by utilizing the properties of chitosan dissolved in an aqueous dilute acid solution. For instance, Japanese patent publication No. 19213/73 discloses a method for obtaining a film of the regenerated chitin by making a film of chitosan followed by acetylating the thus formed film in the solid phase. However, the published reference has as an object of obtaining of film-shaped articles consisting of regenerated chitin and only suggests its application to an acoustic vibrator plate. Accordingly, it is still unsatisfactory from the view point of utilization of chitin resources.

The present inventor, during his research into chitin and chitin derivatives, has quite surprisingly found that when a de-N-acetylated carboxyalkyl chitin or a salt thereof is made to react with an organic acid anhydride, an acylation of the above-mentioned de-N-acetylated carboxyalkyl chitin occurs instantly forming an acylated product which is insoluble in water, acids, alkaline solutions and organic solvents. In addition, it has been also found that the above-mentioned reaction can be applied to making various kinds of shaped materials. Furthermore, it has been also found that the thus obtained shaped material has an excellent function as a separating material, a base material for immobilized enzymes, a material for dialysis and a material for adsorbent as stated in Japanese Patent Application No. 161,389/1978.

The present invention is a result of the further development of the above-mentioned patent application, and the invention has as a main object the provision of a novel shaped material of a mixture of chitin derivatives, which has more superior properties in several uses than that of single chitin derivative.

The present invention provides a shaped material having at least a surface layer which comprises an acylated product of a mixture of two or more kinds of chitin derivatives represented by the following formula (1):

$$[C_6H_8O_3 \cdot (NH_2)_x \cdot (NHCOCH_3)_y \cdot (OR)_a \cdot (OH)_b]_n \quad (1)$$

wherein R represents a carboxyalkyl group with two to four carbon atoms, a hydroxyethyl group, a hydroxypropyl group, a dihydroxypropyl group or an alkyl group with one to three carbon atoms, x is a number of 0.1 to 1.0, y=1.0−x, a is a number of 0 to 1.0, and b=1.0−a,
or a salt thereof.

The shaped material according to the present invention has the following characteristics as compared to the shaped material of single chitin derivative:

(a) The shaped material according to the present invention has a broader permeability and a higher molecular sieve effectiveness because the velocity of acylation of each chitin derivative in the mixture differs.

(b) The above-mentioned shaped material has also high strength and density since the viscosity of the aqueous solution of the mixture of chitin derivatives is easily adjustable.

(c) Further, the porous shaped material is easily available by the salting out effect and the selection of solvent within wide range due to the mixture of chitin derivatives forming a polyion complex.

The shaped material of this invention can be produced by acylation in multiple stages. For instance, the shaped material may be produced by partial acylation with a certain acylating agent and subsequently by further partial acylation with another acylating agent, different from the preceeding acylating agent. In the acylation of multiple stages, the above-mentioned partial acylation with a different acylating agent is multiply carried out until the desired acylated product of the shaped material is obtained.

According to the above-mentioned acylation in multiple stages, by controlling the reaction time of acylation and/or the amount of acylating agent, etc. in each partial acylation, the invention may provide a shaped material including multiple layers in which each layer comprises an acylated product of the mixture of chitin derivatives and the acylated product of one layer is different from the acylated product of an adjacent layer thereof.

Alternatively, according to the acylation of multiple stages, by utilizing the difference of the reaction velocity of acylation of each chitin derivative in the mixture, it is possible that the partial acylation is carried out in the first stage to selectively form the acylated product of chitin derivative having a faster velocity of acylation and then another acylation is carried out on the chitin derivative using a slower reaction velocity of acylation by using another acylating agent. The shaped material thus obtained comprises the acylated product of chitin derivative having the faster reaction velocity and another acylated product of chitin derivative having the slower reaction velocity and has a homogeneous structure therein because the chitin derivative of the slower reaction velocity slowly reacts within the space between the acylated chitin derivative from the faster reaction velocity which had been formed in earlier stage.

Furthermore, chitin to the above-mentioned acylation in multiple stages, it may be possible to prepare a shaped material containing a part of the acylated product formed by an N-acetylated substance which is easily decomposable with enzymes but containing the reminder formed by an acylated substance which from an acylating agent of larger molecular weight such as caproic anhydride which is hardly decomposable with enzymes. This type of shaped material gives a highly porous and shaped material when it is treated with an enzyme such as chitinase, lysozyme etc.

The followings are the detailed description of the present invention.

The chitin derivative according to the invention is defined as a derivative of chitin which is soluble in water or an aqueous dilute acidic solvent such as an aqueous dilute solution of acetic acid, hydrochloric acid, etc. For instance, the soluble derivative of chitin is a compound represented by the following formula:

$$[C_6H_8O_3 \cdot (NH_2)_x \cdot (NHCOCH_3)_y \cdot (OR)_a \cdot (OH)_b]_n$$

wherein R represents a carboxyalkyl group with two to four carbon atoms, a hydroxyethyl group, a hydroxypropyl group, a dihydroxypropyl group or an alkyl group with one to three carbon atoms; x is a number of 0.1 to 1.0; y=1.0−x; a is a number of 0 to 1.0 and b=1.0−a, or a salt thereof. The salts include salts of alkali metals, alkaline earth metals, ammonium, acetic acid and hydrochloric acid, etc.

The de-N-acetylated and etherified products of carboxyalkyl chitin, hydroxyethyl chitin, hydroxypropyl chitin and dihydroxypropyl chitin in the above-mentioned formula have a degree of substitution (a) of preferably 0.1 to 1.0, more preferably 0.3 to 1.0 per one pyranose ring and a degree of de-N-acetylation (x) of 0.1 to 1.0, preferably 0.2 to 0.6 from the view of the solubility to the aqueous solvent and the viscosity of the obtained solution. On the same basis, the de-N-acetylated and etherified products of alkylchitin or methyl-, ethyl- and propylchitin in the above-mentioned formula have a degree of substitution (a) of preferably 0.1 to 1.0 and a degree of de-N-acetylation (x) preferably 0.5 to 1.0, and further the de-N-acetylation product of chitin of which a is 0 in the above-mentioned formula has a degree of de-N-acetylation (x) of preferably 0.5 to 1.0.

The shaped material of a mixture of chitin derivatives according to the present invention is easily available by acylating a mixture of two or more than two derivatives of chitin above-mentioned, and; if necessary further cross-linking the thus acylated product. The composition of the mixture of chitin derivatives, that is, the combination and the ratio of chitin derivatives can be selected optionally according to the properties of the shaped material in use, the viscosity of the solution of the mixture and the velocity of acylation of each chitin derivative which will be described later.

For instance, combination of the de-N-acetylated product of the chitin, the alkylchitin and their salts having a relatively high viscosity in its solution (type A), and the de-N-acetylated product of carboxylalkylchitin, hydroxyethyl chitin, hydroxypropylchitin, dihydroxypropylchitin and their salts having a relatively low viscosity (type B) gives an easy adjustment of the viscosity of the solution of the mixture. Moreover, since such a mixture is composed of chitin derivatives having respectively different velocities of acylation, it is suitable to prepare the shaped material of high strength and having a favorable permeability of substances. In this case of mixture, 0.01 to 100 parts by weight preferably 0.05 to 50 parts by weight of type B may be combined with one part by weight of type A.

The mixture of chitin derivatives is available by mixing aqueous solutions of chitin derivative or gel-like chitin derivatives. When the mixture is obtained by mixing a solution containing an anion of chitin derivative and a solution containing a cation of chitin derivative, a polyion-complex may be formed therebetween in the course of the mixing. The mixture of chitin derivatives according to the invention herein also includes such a polyion-complex.

The manner of carrying out the acylation is to bring an aqueous solution of the mixture of chitin derivatives into contact with an anhydride of an organic acid or with a mixture of the anhydride and the organic acid.

Although the mechanism of the acylation of the present invention has not been elucidated, the reaction under the above-mentioned condition takes place at once when the aqueous solution of the mixture of chitin derivatives is brought into contact with the anhydride of organic acid. The reaction proceeds from the surface of the aqueous solution to be formed into the shaped material and forms an insoluble membrane consisting of the acylated product on the surface of the aqueous solution. The interior of the thus formed membrane is still maintained a in an aqueous solution state. As the reaction proceeds further, the anhydride of organic acid diffuses into the interior via the above-mentioned membrane to bring about the acylating reaction therein gradually, thereby accomplishing the insolubilization of the interior. With respect to the above phenomenon, there can be cases wherein the chitin derivative having a faster velocity of acylation is preferentially insolubilized in the earlier stage, and the other chitin derivative, having a slower velocity of acylation, distributes itself homogeneously within the interior.

The acylated product of chitin derivative is either N-acylated chitosan, O-acylated chitin, N-,O-diacylated chitosan, or a mixture thereof. In addition, it is possible to leave structure-units of unreacted chitin derivatives by adjusting the conditions of the reaction.

According to the present invention, there is provided with a shaped material at least a surface layer of which comprises the acylated product.

The concentration of the mixture of chitin derivatives in the aqueous solution thereof affects the strength and the density of the spherically shaped material to be produced, and when it is higher, the spherically shaped material of larger strength and denser in structure is obtained, and such a spherically shaped material acts as a molecular sieve over a broad range of molecular diameter. Usually the above-mentioned concentration may be 0.1 to 10% by weight, however, the concentration should be adequately adjusted according to the use and the property of the spherically shaped material of the present invention, and it is not necessarily restricted in the above-mentioned range.

As the organic acid and the acid anhydride for use as an acylating agent, aliphatic and aromatic organic acids with two to twenty carbon atoms and their anhydride may be mentioned. For instance, acetic acid, propionic acid, butylic acid, valeric acid, etc. and their anhydrides are suitable. These acids and acid anhydrides are used singly or in a mixture of more than one of them (hereinafter referred to as organic acid anhydride). The organic acid anhydride may be used without dilution, or used after addition of a solvent inert to the organic acid or its anhydride, for instance, an organic solvent such as benzene, toluene, xylene, pyridine, etc. or a surfactant to adjust the rate of acylating reaction and to make the after-treatment of the acylated product easy.

The acylation is carried out at a temperature of 5° to 80° C., preferably 5° to 60° C., however, in the case where the chitin derivative has a degree of de-N-acetylation of over 0.6, a higher temperature is preferable.

In addition, in case where the mixture of chitin derivatives is brought into reaction with a gaseous organic acid anhydride, the reaction temperature may be still higher.

The mode of adding the above-mentioned liquid mixture into the acylating agent can be suitably selected according to the use and form of the shaped material of the present invention.

For instance, a mode can be exemplified in which the liquid mixture prepared from more than two chitin derivatives is dropped into an organic acid anhydride under agitation to form dispersed small particles.

The concentration of the mixture of chitin derivatives in the aqueous solution, as stated before, may be a 0.1 to 10% by weight. When the viscosity of the above-mentioned solution is high, however, sometime it is difficult to obtain a porous shaped material with a small diameter. In such a case, a viscosity-reducing agent such as ethylene glycol, glycerol, alcohol, etc. may be added in the above-mentioned aqueous solution.

The amount of the organic acid anhydride used as the acylating agent is not particularly restricted. However, in general, it may be 1 to 100 times by equivalent, preferably 5 to 20 times by equivalent per one equivalent of amino group of the de-N-acetylated product of the mixture of chitin derivatives according to the invention.

Further, in order to obtain a more porous shaped material and to accelerate the acylation, the above-mentioned liquid mixture is prepared by adding 0.1 to 5 parts by weight of the diluent, 0.001 to 1 part by weight of the porosity-regulating agent and 0.001 to 0.1 part by weight of the surfactant to one part by weight of the aqueous solution of the mixture of chitin derivatives. The order of the above-mentioned addition and its method are not specifically restricted but may be carried out optionally. In usual cases, the diluent was at first added to the aqueous solution of the mixture of chitin derivatives to obtain an homogeneous solution, and then the porosity-regulating agent containing the surfactant is added to the homogeneous solution. The thus obtained liquid mixture is usually in a state of emulsified dispersion, however, it may take an appearance of a homogeneous solution according to the proportional amount of the composition therein.

The diluent according to the invention should have a compatibility to the aqueous solution of the mixture of chitin derivatives and the porosity-regulating agent. The diluent is used to adjust the viscosity of the liquid mixture and to assist the homogeneous dispersibility of the liquid mixture.

As the diluent, alcohols with carbon atoms of one to four, pyridine or compounds represented by the general formula of $R-O+(CH_2)_2O]_nR'$ wherein R and R' represent respectively either a hydrogen atom or an alkyl group of $C_1$ to $C_4$ and n is an integer of 1 to 3 may be mentioned. The diluent is typically exemplified by a compound selected from the group consisting of methanol, ethanol, n-propanol, iso-propanol, pyridine, ethylene glycol, ethylene glycol monomethyl ether, ethylene glycol monoethyl ether, ethylene glycol mono-n-butyl ether, ethylene glycol dimethyl ether, ethylene glycol diethyl ether, ethylene glycol di-n-butyl ether, diethylene glycol monomethyl ether, diethylene glycol monoethyl ether, diethylene glycol mono-n-butyl ether, diethylene glycol dimethyl ether, diethylene glycol diethyl ether and diethylene glycol di-n-butyl ether or mixtures comprising more than two of them.

The porosity-regulating agent according to the invention is used for the object of obtaining a homogeneous acylation within the shaped material in the acylation of the above-mentioned liquid mixture, which will be described later, and of making the thus obtained shaped material of a mixture of chitin derivatives highly strong and highly porous. For those purposes, the porosity-regulating agent of the present invention should be insoluble into water, inert to the acylating agent and compatible to the acylating agent and to the diluent. It is possibly exemplified by a volatile aromatic hydrocarbon such as benzene, toluene, xylene, etc. In addition, the amount of addition of the porosity-regulating agent may be optionally determined depending upon the desired pore-size or pore-volume of the shaped material.

The surfactant for use in the process of the invention is preferably non-ionic in nature, for instance, monolaurate, monopalmitate, monostearate, monooleate or trioleate, etc. of sorbitan or polyoxyethylene sorbitan. The above-mentioned surfactant is effective in dissolving or finely dispersing the above-mentioned diluent and the above-mentioned porosity-regulating agent into the aqueous solution of the mixture of above-mentioned chitin derivatives and is further effective in dispersing fibrous material formed by diluting the solution of the chitin derivatives with a large amount of the diluent. The presence of the surfactant is effective in carrying out the acylation homogenously.

The porous and shaped material is also available by the formation of a polyion complex of the mixture of chitin derivatives, dissolving the thus formed complex into an aqueous solution of salts and then acylating. In addition, the machine for use in dispersing and shaping the material of acylated chitin derivatives of the present invention may be chosen from a stirrer provided with usual stirring blades, a static mixer, homogenizer a or the like.

As has been described, in the above-mentioned mode, the reaction proceeds instantaneously inward from the surface of the droplets of the above-mentioned aqueous solution to form a insoluble membrane made of acylated product of a mixture of chitin derivatives with the result of producing capsule-like product of spherical shape. And on the continuation of the above-mentioned reaction, the organic acid anhydride diffuses into the droplet to form a gel which optionally can be insolubilized. After carring out the reaction for a predetermined time period, gel-like porous spherical particles comprising acylated chitin derivative of the present invention are obtained by separating the particles and washing the particles to remove the unreacted organic acid anhydride from the particles. The thus obtainable spherical particles may have a diameter ranging from about 1 to 10,000 microns according to the dispersing degree, the viscosity of the liquid mixture, etc.

In order to change the compactness of the gel-like porous material of the invention, the concentration of the mixture of chitin derivatives in the aqueous solution, the temperature and the time period of the reaction, the amount of the diluent, etc. and varied. According to the invention, the compactness will be changed to be such that the threshold molecular weight of the substance passable through the pores of the product of the present invention is in the range of 500 to 400,000.

As another modification, the spinning of the liquid mixture through nozzles into a liquid containing the organic acid anhydride is exemplified. In this modification, a fiber-shaped material at least the surface layer of which is insolubilized is obtained. By washing the fiber-shaped material, gel-like fiber-shaped material comprising acylated product according to the invention is possibly available. Or, by using slit-formed nozzles, gel-like film-shaped material comprising an acylated product of the present invention is obtained. In the case of film-shaped material and of fiber-shaped material, it is also possible to obtain hollow-shaped material, and to control the thickness and the compactness of the membrane as desired as in the case of spherical particles.

The invention is not only restricted to the above-mentioned modifications. Various manners of adding the aqueous solution of the mixture of chitin derivatives into the acylating solution can be employed.

The gel-like shaped material of chitin derivatives according to the present invention obtainable by the above-mentioned methods has a water-content ranging 10 to 100 times by weight of the weight of the material in a dry state.

The gel-like shaped material according to the present invention can be subjected to cross-linking as desired or needed, and the cross-linking can be carried out, for instance, by the following method:

First, the water content of the gel-like shaped material of the invention is reduced to 2 to 3 times by weight of the weight of the material in a dry state by a treatment such as centrifugation, etc. Then the gel-like material is immersed into an aqueous alkali solution such as sodium hydroxide (concentration of larger than 40% by weight) in an amount of more than 2 times, preferably 4 to 30 times by weight of the weight of the material in dry state. The immersion is carried out at a temperature of lower than 15° C. for 1 to 5 hours. After the immersion is over, the excess alkali solution is removed off while maintaining the state of immersion in an aqueous alkali solution in an amount of 3 to 6 times by weight of the weight of the material in dry state. Then the mixture is left at a temperature of 0° to 10° C. for one to 24 hours to obtain a pre-treated material by alkali. In addition, it is preferable for the next step of cross-linking to subject the immersed material to freezing at a temperature of 0° to −30° C. for one to 24 hours. Then, the above-mentioned pre-treated material by alkali is dispersed into water or an organic solvent containing a cross-linking agent in the amount of 0.1 to 3 times, preferably 0.5 to 2 times by mol per one pyranose ring of the acylated product to react for 5 to 48 hours at a temperature of lower than 15° C. After the reaction is over, the reaction product is washed with water and is neutralized to be the water-insoluble and cross-linked shaped material.

As the cross-linking agent, an epoxy-type compound such as epichlorohydrin, epibromohydrin, 2,3-dibromopropanol and 2,3-dichloropropanol is suitable. In addition, the degree of cross-linking may be 0.01 to 0.3 per one unit of pyranose ring determined by elementary analytical values.

As has been shown in the above-mentioned explanation, according to the invention, it is easily possible to prepare the optionally shaped material such as spherical, fiber-like, film-like, etc. As the shaped material of the invention is constituted of acylated product of the mixture of chitin derivatives, which is porous, permeable, stable chemically and safe in living bodies, it is applicable to a broad range of uses.

Particularly, the spherically shaped material of the present invention is utilizable as an ion-exchanger by leaving some amino groups intact with the controlled amount of acylating agent or with reduction of reaction time in 2-component system in which the velocities of acylation differ mutually.

Since the material according to the present invention is extremely stable and safe to living bodies, it is utilizable in the field concerning living bodies, for instance, in blood perfusion, as an adsorbent orally administrated to adsorb toxins within the gastro-intestinal tracts or a coating material for adsorbents, etc. In addition, in the case of using the material in contact with the blood, there is a method in which some amino groups of the material are left free to form polyions with an anti-thrombogenic substance such as heparin, chitosan sulfate, chitin sulfate, etc., and more preferably, the amino groups are sulfated.

As has been described above, the present invention is epoch-making in effective utilization of chitin which has hitherto been a resource with limited usage, and innumerable developments are expected as to its usage.

The present invention will be explained more in detail while referring to the following unlimited examples:

EXAMPLE 1

Into 100 g of an aqueous 2% by weight solution of acetic acid, 5 g of de-N-acetylated chitin with a degree of de-N-acetylation of 0.95 and one gram of de-N-acetylated carboxymethylchitin with a degree of carboxymethylation of 0.3 and a degree of de-N-acetylation of 0.6 were dissolved. A liquid mixture prepared by dissolving 50 g of ethanol and one gram of polyoxyethylene sorbitan monooleate was added to the above-mentioned solution to be a homogenous mixed solution A.

In the next place, 50 g of acetic anhydride and 5 g of polyoxyethylene sorbitan monooleate were dissolved in 2 liters of toluene in a vessel provided with a bow-type stirrer, and then the above-mentioned solution A was added into the vessel under agitation at 1,000 rpm at room temperature for one hour to make a dispersion in which an acylation took place. After the reaction was over, one liter of ethanol was added to the reaction mixture under agitation to obtain a spherically shaped material. After separating by filtration and washing the separated material with ethanol, the washed material was dispersed into one liter of distilled water and the pH of the aqueous dispersion was adjusted to 8.0. After collecting the thus treated material by filtration and washing off sodium acetate and sodium hydroxide which adhered to the material with distilled water, a gel-like spherical material of the present invention was obtained having a diameter of 50 to 150 microns (Specimen A).

As a comparative specimen (Specimen B), the above-mentioned procedures were carried out on the homogeneous mixed solution B obtained by dissolving 5 g of the same de-N-acetylated chitin in the aqueous solution of acetic acid and adding the same amount of the ethanol and the polyoxyethylene oleate to prepare a gel-like spherical material having a diameter of 50 to 150 microns.

After drying, both the Specimens A and B showed no infrared absorption bands at 1500 to 1530 cm$^{-1}$ due to amino group and at 1700 to 1720 cm$^{-1}$ due to carboxyl

EXAMPLE 5

Into 200 g of an aqueous 2% by weight solution of acetic acid, 5 g of de-N-acetylated hydroxyethylchitin with a degree of hydroxyethylation of 1.0 and a degree of de-N-acetylation of 0.6 were dissolved. The thus prepared solution was slowly added under agitation to a liquid mixture prepared by dissolving 200 g of an aqueous 2% by weight solution of sodium hydroxide and 5 g of de-N-acetylated carboxymethylchitin with a degree of carboxymethylation of 0.6 and a degree of de-N-acetylation of 0.3. After the addition, agitation was continued for one hour to form a white polyion complex. The yield of the polyion complex, after separation by filtration, washing with water and drying, was 9 g.

In the next phase, after dissolving 5 g of the thus prepared polyion complex into 100 g of an aqueous 10% by weight solution of sodium acetate, a liquid mixture prepared by dissolving 30 g of ethanol and 2 g of polyoxyethylene sorbitan monooleate was added to the above-mentioned solution of polyion complex to prepare a homogeneous mixed solution. Then, the above-mentioned solution was subjected to acylating by the same procedures as in Example 1 to obtain a gel-like spherical material according to the present invention.

After drying, the thus obtained material showed no infrared absorption bands at 1500 to 1530 cm$^{-1}$ due to amino group and at 1700 to 1720 cm$^{-1}$ due to carboxyl group. The elementary analytical data show fairly good coincidence with those of chitin.

The gel-like material was subjected to cross-linking by the same method as in Example 2. The cross-linked product was evaluated on its separating ability but 20 g of dextran (iv) of molecular weight $5 \times 10^5$ was added as a solute to the above-mentioned solutes (i) to (iii). The elution patern is shown in Table 3. As is seen in Table 3, the cross-linked shaped material according to the present invention showed a high molecular sieve effectiveness and an excellent separating ability.

TABLE 3

| Solute | Elution Pattern Amount of Eluant (ml) |
|---|---|
| Blue-dextran | 55–65 |
| Dextran (i) | 65–75 |
| Dextran (ii) | 85–95 |
| Dextran (iii) | 110–120 |
| Dextran (iv) | 130–140 |

EXAMPLE 6

Solution A prepared in Example 1 was subjected to de-airing to be starting material for spinning.

The fibrous shaped material of acylated product of a mixture of chitin derivatives was obtained by spinning the starting material with using a spinning apparatus which was provided with a tank for the starting material, a reacting vessel of 50 mm in diameter and 5,000 mm in length provided with 50 nozzle-holes of 0.1 mm in diameter, a roller, solvent-removing vessel containing a mixture of ethanol and water, an another solvent-removing vessel containing hot water at a temperature of 100° C. and a take-up winder. The composition of the solution introduced into the reacting vessel kept at a temperature of 50° C. was as follows:

toluene:acetic anhydride:polyoxyethylene monooleate = 10:5:1 (by weight). The spinning was carried out at an output pressure of 1 kg/cm$^2$.

The thus obtained fibrous material had a diameter of 15 microns and a tensile strength of 430 kg/cm$^2$ in the dry state.

The spinning procedures were carried also on solution B of Example 1 to obtain fibrous material. Whe the fibrous material was immersed into an aqueous 5% by weight solution of acetic acid, however, a part of the material dissolved. After drying the above-mentioned fibrous material, it showed a tensile strength of 100 kg/cm$^2$. It is considered that acylation was insufficient to leave unreacted substances in this material.

EXAMPLE 7

Into 100 g of an aqueous 2% by weight solution of acetic acid, 1 g of de-N-acetylated carboxymethylchitin with a degree of carboxymethylation of 0.5 and a degree of de-N-acetylation of 0.5 and 4 g of de-N-acetylated methylchitin with a degree of methylation of 0.5 and a degree of de-N-acetylation of 0.9 were dissolved. A liquid mixture prepared by 50 g of methanol and 1 g of polyoxyethylene sorbitan monooleate were added to the above-mentioned solution under agitation to prepare a homogeneous mixed solution G.

In the next place, 25 g of acetic anhydride and 5 g of polyoxyethylene sorbitan monooleate were dissolved in 2 liters of toluene in the first vessel same as in Example 1. In the other second vessel, 25 g of lauric anhydride and 5 g of polyoxyethylene sorbitan monooleate were dissolved in 2 liters of benzene. The above-mentioned solution G was added into the first vessel containing acetic anhydride under agitation of 1,000 rpm for 10 min at room temperature to carry out acylation. A sherically shaped material (Specimen G) was obtained by filtering the reaction mixture in the first vessel. Then, the Specimen G was added into the second vessel containing lauric anhydride under agitation of 1,000 rpm at room temperature for one hour to carry out another acylation. The same procedures as in Example 1 were taken to obtain shperically shaped gel-like material (Specimen H).

Furthermore, a liquid prepared by dissolving 25 g of acetic anhydride, 25 g of lauric anhydride and 5 g of polyoxyethylene sorbitan monooleate into 2 liters of toluene was added to the above-mentioned solution G to carry out acylation as in Example 1. After acylating, a spherically shaped gel-like material was obtained (Specimen I).

The dried specimen G showed no infrared absorption band at 1700 to 1720 cm$^{-1}$ due to carboxyl group, however, the infrared absorption band at 1500 to 1530 cm$^{-1}$ due to amino group was observed.

On the other hand, both of the dried specimens H and I showed no infrared absorption bands at 1500 to 1530 cm$^{-1}$ and 1700 to 1720 cm$^{-1}$.

The thus obtained specimens H and I, and the specimen A obtained in Example 1 were sifted to be a size of 50 to 150 microns in diameter, and then they were respectively treated with chitinase as follows:

The specimen was added to an aqueous acetic acid-buffer solution of pH 6.0. After leaving for one hour, chitinase was added to the buffer solution and the mixture was shaken for 72 hours at room temperature.

By the above-mentioned treatment, two Specimens A and I became brittle and smaller in size than the initial state with pulverization, however, the Specimen H showed scarcely any change of particle diameter and strength.

group. Their elementary analytical compositions of both specimens were as follows:

|  | C | H | O | N |
|---|---|---|---|---|
|  | (% by weight) | | | |
| Specimen A | 46.4 | 6.4 | 40.5 | 6.7 |
| Specimen B | 46.5 | 6.4 | 40.4 | 6.8 |

These values show fairly good coincidence with those of chitin.

EXAMPLE 2

Each 5 g of the gel-like material obtained in Example 1 was dehydrated by centrifugation to the degree of its water-content of 2 g/g of dry matter and then the thus dehydrated material was immersed into 23 times by weight of an aqueous 43.5% by weight solution of sodium hydroxide at a temperature of 10° C. for 3 hours. After compressing the thus immersed material to remove the aqueous solution of sodium hydroxide by centrifugation to the water content of 3 g/g of dry matter and leaving to stand for two hours at 0° C., the thus treated material was frozen for one hour at −20° C. Then, a solution of epichlorhydrin in amount of 2 times by mol of the above-mentioned gel-like product in dry state in isopropyl alcohol in an amount of 50 times by weight of the gel-like product in dry state was introduced into a flask provided with a stirrer and kept at a temperature of 0° to 5° C., and the above-mentioned frozen gel-like product was added to the solution to carry out a reaction for 5 hours.

The reaction was continued further for 5 hours at a temperature of 15° C. After the reaction was over, the reaction mixture was filtered to obtain a solid material which was washed with ethanol and then was dispersed into distilled water, and was neutralized with an aqueous 1 N solution of hydrochloric acid while cooling from outside. The thus obtained solid material was separated by filtration and washed with water to obtain a spherically cross-linked material.

Each of the cross-linked shaped materials was filled up in a column of 2 cm in inner diameter at a height corresponding to a volume of 150 ml. The columns were subjected to a test of separating ability to substances of the specimens by the following procedures:

20 mg of blue-dextran of molecular weight of $2 \times 10^6$, of dextran (i) of molecular weight of $2.5 \times 10^5$, of dextran (ii) of molecular weight of $1 \times 10^5$ and the dextran (iii) of molecular weight of $1 \times 10^4$ were respectively dissolved into 2 ml of distilled water, and the solution was developed on the above-mentioned column. Distilled water was poured onto the column at a rate of 1 ml/min. The eluants were analyzed by the total carbon analyzer and an infrared analyzer. The elution-pattern thus obtained is shown in Table 1.

As is clearly shown in Table 1, the cross-linked and shaped material according to the present invention exhibited the excellent and a high molecular sieve effectiveness.

TABLE 1

| | Elution Pattern | |
|---|---|---|
| | Amount of Eluant (ml) | |
| Solute | Specimen A (Present invention) | Specimen B (Comparative) |
| Blue-dextran | 55–65 | 55–65 |
| Dextran (i) | 80–90 | 70–80 |

TABLE 1-continued

| | Elution Pattern | |
|---|---|---|
| | Amount of Eluant (ml) | |
| Solute | Specimen A (Present invention) | Specimen B (Comparative) |
| Dextran (ii) | 105–115 | 80–90 |
| Dextran (iii) | 125–135 | 90–100 |

EXAMPLE 3

Into 100 g of an aqueous 2% by weight solution of acetic acid, 2.5 g of de-N-acetylated dihydroxypropylchitin with a degree of 2,3-dihydroxypropylation of 0.3 and a degree of de-N-acetylation of 0.9 and 2.5 g of de-N-acetylated chitin with a degree of de-N-acetylation of 0.9 were dissolved. A liquid mixture prepared by dissolving 100 g of propanol and one gram of polyoxyethylene sorbitan monoleate was added to the above-mentioned solution to prepare a homogeneously mixed solution C.

In the next plate, 50 g of propionic anhydride, and 5 g of polyoxyethylene sorbitan monooleate were dissolved in 2 liters of xylene in the same vessel as in Example 1, and the above-mentioned solution C was added into the vessel under agitation at 1,000 rpm at room temperature for one hour to make a dispersion in which an acylation took place. Then, according to the same procedures as in Example 1, the spherically shaped gel-like material of the present invention was obtained (Specimen C).

As comparative specimens another spherically shaped gel-like material was obtained using either de-N-acetylated chitin or de-N-acetylated dihydroxypropylchitin as in used in Example 1 as the single starting material by the same procedures as in Example 1. The thus obtained comparative specimens were called as Specimen D (using dihydroxypropylchitin) and Specimen E (using chitin).

The thus obtained specimens C, D and E were found to contain 10 g of water per one gram of dry matter. The results of infrared analysis and elementary analysis carried on these specimens revealed that these specimens were N-propionylchitosan.

EXAMPLE 4

The separating ability of substances was determined on the specimens C, D and E obtained in Example 3 by the same procedure in Example 2. The results are shown in Table 2. As is seen in Table 2, the Specimen C according to the present invention showed a higher separating ability than the Comparative Specimens, D and E.

TABLE 2

| | Elution Pattern | | |
|---|---|---|---|
| | Amount of Eluant (ml) | | |
| Solute | Specimen C (Present invention) | Specimen D (Comparative) | Specimen E (Comparative) |
| Blue-dextran | 55–65 | 55–65 | 55–65 |
| Dextran (i) | 75–85 | 70–80 | 70–80 |
| Dextran (ii) | 100–110 | 80–90 | 80–90 |
| Dextran (iii) | 120–130 | 90–100 | 90–100 |

In addition, the weight of the material was examined before and after the treatment with chitinase. All the specimens removed the smaller particles of less than 50 microns in diameter by water-sifting showed a decrease of its weight, the percentage of decrease was 25% in A, 20% in I and 4% in H. The clear difference between the specimens is considered to be due to the difference of decomposition by chitinase corresponding to the difference of chemical structure between the specimens. It is still considered that in Specimen H, the chitin derivatives with different velocity of acylation are arranged homogeneously.

The separating ability of substances was tested as in Examples 2 and 5 on the specimen I before and after the treatment with chitinase. The results are shown in Table 4. As is seen in Table 5, the separating ability of the specimen treated with chitinase became larger.

TABLE 4

| | Change of Elution Pattern | |
| --- | --- | --- |
| | Amount of Elution (ml) | |
| Solute | Before treatment | After treatment |
| Blue-dextran | 55–65 | 60–70 |
| Dextran (i) | 60–70 | 70–80 |
| Dextran (ii) | 80–90 | 90–100 |
| Dextran (iii) | 105–115 | 110–120 |
| Dextran (iv) | 125–135 | 135–145 |

EXAMPLE 8

Into 100 g of an aqueous 2% by weight solution of acetic acid, 2.5 g of de-acetylated chitin with a degree of de-N-acetylation of 0.9 and 2.5 g of de-N-acetylated ethylchitin with a degree of ethylation of 0.7 and a degree of de-N-acetylation of 0.9 were dissolved. A liquid mixture prepared by dissolving one gram of polyoxyethylene sorbitan monooleate and 5 g of toluene into 50 g of ethanol were further added to the above-mentioned solution to be a mixed solution J.

On the other hand, into another 100 g of an aqueous 2% by weight solution of acetic acid, 2 g of de-acetylated chitin as above, 2 g of de-acetylated ethylchitin as above and one gram of de-N-acetylated carboxymethylchitin with a degree of carboxymethylation of 0.5 and a degree of de-N-acetylation of 0.8 were dissolved. Then, one gram of polyoxyethylene sorbitan monooleate dissolved in 50 g of ethanol were added to the above-mentioned solution to form a mixed solution K. The both Solutions J and K were respectively acylated as in Example 1 to obtain respective spherically shaped gel-like materials (Specimens J and K). The separating ability of Specimens J and K was tested using the same procedures as in examples 2 and 5. The results are shown in Table 5.

TABLE 5

| | Elution pattern | |
| --- | --- | --- |
| | Amount of Eluant (ml) | |
| Solute | Specimen J | Specimen K |
| Blue-dextran | 55–65 | 55–65 |
| Dextran (i) | 65–75 | 60–70 |
| Dextran (ii) | 90–100 | 80–90 |
| Dextran (iii) | 110–120 | 105–115 |
| Dextran (iv) | 130–140 | 125–130 |

As seen in Table 4, the spherically shaped gel-like material according to the present invention showed a high molecular sieve effectiveness and an excellent separating ability.

EXAMPLE 9

Into 100 g of an aqueous 1% by weight solution of hydrochloric acid, 4 g of de-N-acetylated carboxymethylchitin with a degree of carboxymethylation of 0.5 and a degree of de-N-acetylation of 0.5 and 1 g of de-N-acetylated hydroxyethylchitin with a degree of hydroxyethylation of 0.5 and a de-N-acetylation of 0.8 were dissolved. Then, 20 g of ethanol was added to the above-mentioned solution to prepare a homogeneous solution K.

In the next phase, 20 g of capric anhydride and 5 g of polyoxyethylenesorbitan monooleate were dissolved in 2 liters of toluene in the same vessel as in Example 1, and then the above-mentioned solution K was added into the vessel under agitation of 1,000 rpm for 15 min at room temperature to carry out acylation. A white spherically shaped material was thus formed. To the solution containing the above-mentioned shaped material, 10 g of propionic anhydride was added to further carry out acylation. The thus-obtained mixture was treated by the same procedures as in Example 1 to obtain a spherically shaped gel-like material.

What is claimed is:

1. A shaped material having at least a surface layer which consists essentially of an acylated mixture of at least two kinds of chitin derivatives selected from the group consisting of de-acetylated chitin and the compounds represented by the general formula (1):

$$[C_6H_8O_3 \cdot (NH_2)_x \cdot (NHCOCH_3)_y \cdot (OR_a \cdot (OH)_b]_n \qquad (1)$$

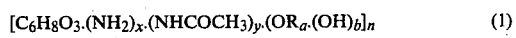

wherein R represents a carboxyalkyl group with two to four carbon atoms, a hydroxyethyl group, a hydroxypropyl group, a dihydroxypropyl group or an alkyl group with one to three carbon atoms; x is a number of 0.1 to 1.0; y is a difference between 1.0 and x; a is a number of 0.1 to 1.0 and b is a difference between 1.0 and a, or salts thereof.

2. The shaped material according to claim 1, wherein the number of x is 0.2 to 0.6 when R in the formula (1) represents the carboxyalkyl group with two to four carbon atoms, the hydroxyethyl group, the hydroxypropyl group or the dihydroxypropyl group.

3. The shaped material according to claim 1, wherein the number of x is 0.5 to 1.0, preferably 0.5 to 0.9 when R in the formula (1) represents the alkyl group with one to three carbon atoms.

4. The shaped material according to claim 1, wherein the mixture contains at least one chitin derivative selected from the group A consisting of the de-N-acetylated chitin and the de-N-acetylated alkyl chitin in the formula (1) and at least one chitin derivative selected from the group B consisting of the de-N-acetylated carboxyalkyl chitin, the de-N-acetylated hydroxyethyl chitin, the de-N-acetylated hydroxypropyl chitin and the de-N-acetylated dihydroxypropyl chitin in the formula (1).

5. The shaped material according to claim 4, wherein the mixture contains one part by weight of the chitin derivative(s) of group A and 0.01 to 100, preferably 0.05 to 50 parts by weight of the chitin derivative(s) of group B.

6. The shaped material according to claim 1, wherein the number of a is 0.3 to 1.0 when R represents a carboxyalkyl group with two to four carbon atoms, a hydroxyethyl group, a hydroxypropyl group or a dihydroxypropyl group, when said chitin derivative is de-N-acetylated and etherified.

7. The shaped material according to claim 1 which is cross-linked to the degree of cross-linking of 0.01 to 0.3 per one unit of pyranose ring with a cross-linking agent selected from the group consisting of epichlorohydrin, epibromohydrin, 2,3-dibromopropanol and 2,3-dichloropropanol.

8. The shaped material according to claim 1 which comprises multiple layers each of which has a degree of acylation different from each other.

9. A shaped material according to claim 1, wherein said de-acetylated chitin has a degree of de-N-acetylation of 0.5 to 1.0 per one pyranose ring.

10. The shaped material according to claim 2, 3, 5, 6, 7, 8, 1 or 9, wherein is in the form of a sphere, fiber or film.

* * * * *